(12) United States Patent
Mansoor et al.

(10) Patent No.: US 6,412,836 B1
(45) Date of Patent: Jul. 2, 2002

(54) BUMPER SYSTEM FOR MOTOR VEHICLES

(75) Inventors: Dhafer Mansoor, West Bloomfield; Gregory Stanley Frederick, Sterling Hts.; Shui-Fang Chou, Troy; Jeffrey A. Anderson, Clarksville, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/686,702

(22) Filed: Oct. 11, 2000

(51) Int. Cl.$^7$ .......................... B60R 19/26; B60R 19/34
(52) U.S. Cl. ....................... 293/132; 293/133; 293/155; 296/189
(58) Field of Search ................................ 296/188, 189; 293/102, 130, 132, 133, 146, 154, 155

(56) References Cited

U.S. PATENT DOCUMENTS

| | | |
|---|---|---|
| 1,581,432 A | 2/1926 | Fageol |
| 1,935,447 A | 11/1933 | Hoffman |
| 2,604,349 A | 7/1952 | Martinetz |
| 2,753,193 A | 7/1956 | Halverson |
| 2,828,144 A | 3/1958 | Hosmer |
| 3,412,628 A | 11/1968 | De Gain |
| 3,495,474 A | 2/1970 | Nishimura et al. |
| 3,578,358 A | 5/1971 | Reynolds |
| 3,739,882 A | 6/1973 | Schweak et al. |
| 3,819,224 A | 6/1974 | Casey et al. |
| 3,831,997 A | 8/1974 | Myers |
| 3,885,817 A | 5/1975 | Christian |
| 3,888,515 A | 6/1975 | Winter |
| 3,897,095 A | 7/1975 | Glance et al. |
| 3,905,630 A | 9/1975 | Cantrell |
| 3,912,295 A | 10/1975 | Eggert, Jr. |
| 3,930,670 A | 1/1976 | Haskins |
| 3,938,841 A | 2/1976 | Glance et al. |
| 3,964,768 A | 6/1976 | Reynolds |
| 3,997,207 A | 12/1976 | Norlin |
| 3,998,485 A | 12/1976 | Putter et al. |
| 4,023,652 A | 5/1977 | Torke |
| 4,190,276 A | 2/1980 | Hirano et al. |
| 4,200,318 A | 4/1980 | Gute et al. |
| 4,272,114 A | 6/1981 | Hirano et al. |
| 4,328,986 A | 5/1982 | Weller et al. |
| 4,348,042 A | 9/1982 | Scrivo |
| 4,457,547 A | 7/1984 | Sekiiyama et al. |
| 4,465,312 A | 8/1984 | Werner |
| 4,466,646 A * | 8/1984 | Delmastro et al. .......... 293/117 |
| 4,468,052 A | 8/1984 | Koike |
| 4,597,601 A | 7/1986 | Manning |
| 4,829,979 A | 5/1989 | Moir |
| 4,830,686 A | 5/1989 | Hashiguchi et al. |
| 4,893,856 A | 1/1990 | Council |
| 4,901,486 A | 2/1990 | Kobori et al. |
| 4,940,270 A * | 7/1990 | Yamazaki et al. .......... 293/122 |
| 5,005,887 A | 4/1991 | Kelman |
| 5,056,840 A | 10/1991 | Eipper et al. |
| 5,078,439 A | 1/1992 | Terada et al. |
| 5,080,411 A | 1/1992 | Stewart et al. |
| 5,116,092 A | 5/1992 | Schönleber |
| 5,154,462 A | 10/1992 | Carpenter |
| 5,201,912 A | 4/1993 | Terada et al. |
| 5,273,330 A | 12/1993 | Petry et al. |
| 5,290,078 A | 3/1994 | Bayer et al. |
| 5,306,058 A * | 4/1994 | Sturrus et al. .............. 293/154 |
| 5,314,229 A | 5/1994 | Matuzawa et al. |

(List continued on next page.)

FOREIGN PATENT DOCUMENTS

| | | |
|---|---|---|
| DE | 2 137 517 | 2/1973 |
| GB | 2 307 665 | 11/1995 |

Primary Examiner—Stephen T. Gordon
Assistant Examiner—Greg Blankenship
(74) Attorney, Agent, or Firm—David B. Kelley

(57) ABSTRACT

A bumper system for a motor vehicle includes an energy absorber and a bumper beam interconnecting the energy absorber and vehicle structure and having a general B shape to absorb energy during an impact with an object by the bumper system.

14 Claims, 11 Drawing Sheets

U.S. PATENT DOCUMENTS

| | | |
|---|---|---|
| 5,387,002 A | 2/1995 | Grevich |
| 5,393,111 A | 2/1995 | Eippet et al. |
| 5,419,416 A | 5/1995 | Miyashita et al. |
| 5,431,445 A | 7/1995 | Wheatley |
| 5,688,006 A | 11/1997 | Bladow et al. |
| 5,722,708 A | 3/1998 | Jonsson |
| 5,727,804 A | 3/1998 | Metzger |
| 5,732,801 A | 3/1998 | Gertz |
| 5,785,367 A | 7/1998 | Baumann et al. |
| 5,803,514 A | 9/1998 | Shibuya et al. |
| 5,853,187 A | 12/1998 | Maier |
| 5,876,078 A | 3/1999 | Miskech et al. |
| 5,967,592 A | 10/1999 | Freeman |
| 6,000,738 A * | 12/1999 | Stewart et al. .............. 293/102 |
| 6,003,912 A | 12/1999 | Schonhoff et al. |
| 6,042,163 A * | 3/2000 | Reiffer ....................... 293/155 |
| 6,059,331 A * | 5/2000 | Mori .......................... 293/133 |
| 6,089,628 A | 7/2000 | Schuster |
| 6,179,353 B1 | 1/2001 | Heatherington et al. |
| 6,179,355 B1 * | 1/2001 | Chou et al. ................. 293/132 |
| 6,217,089 B1 * | 4/2001 | Goto et al. ................. 293/102 |
| 6,227,582 B1 | 5/2001 | Ichien |

* cited by examiner

BUMPER SYSTEM FOR MOTOR VEHICLES

BACKGROUND OF THE INVENTION

1. Field of the Invention

The present invention relates generally to bumpers for motor vehicles and, more specifically, to a bumper system for a motor vehicle.

2. Description of the Related Art

It is known to provide a bumper system for a front end or rear end of a motor vehicle. For a front end of the motor vehicle, the bumper system typically includes a bumper beam extending transversely and secured to a forward end of a pair of front rails, which extend longitudinally and are spaced transversely. The bumper system also includes an energy absorber extending transversely and secured to the bumper beam. The bumper system may include a fascia disposed over and covering the energy absorber.

It is also known that the bumper system protects a body of the motor vehicle from low speed impact with an object through elastic or semi-plastic deformation of the energy absorber. It is further known that the bumper system is an absorber for high-speed impact with an object through major plastic deformation of the bumper beam.

Although the above bumper system has worked well, it suffers from the disadvantage that the bumper beam has a con stant cross-section which is either too weak to resist low speed impact at a center thereof or makes it too strong to absorb impact energy before the supporting vehicle rails collapse under the motor vehicle. Therefore, there is a need in the art to provide a bumper beam which will better balance both low speed impact protection and high speed energy absorption for a bumper system of a motor vehicle.

SUMMARY OF THE INVENTION

Accordingly, the present invention is a bumper system for a motor vehicle. The bumper system includes an energy absorber and a bumper beam interconnecting the energy absorber and vehicle structure and having a general B shape to absorb energy during an impact with an object by the bumper system.

One advantage of the present invention is that a new bumper system is provided for a motor vehicle. Another advantage of the present invention is that the bumper system includes a bumper beam made from a manufacturing process such as a roll formed process or an extrusion process with a generally "B" shaped cross-section which balances both low-speed impact and high-speed impact of the motor vehicle. Yet another advantage of the present invention is that the bumper system has an energy absorber to absorb the high-speed impact with an object and to protect the vehicle body from low-speed impact with an object. Still another advantage of the present invention is that the bumper system has a "B" shaped bumper beam to serve as an impact initiator to improve high-speed impact energy absorption efficiency. A further advantage of the present invention is that the bumper assembly has an inclined "B" bumper with specific geometry to provided uniform high-speed impact energy absorption. Yet a further advantage of the present invention is that the bumper system has a bumper beam that allows sequential collapse of inner walls to the collapse of upper/lower walls by partially supported rails of the motor vehicle.

Other features and advantages of the present invention will be readily appreciated, as the same becomes better understood, after reading the subsequent description when considered in connection with the accompanying drawings.

DESCRIPTION OF THE PREFERRED EMBODIMENT(S)

Figure 1:
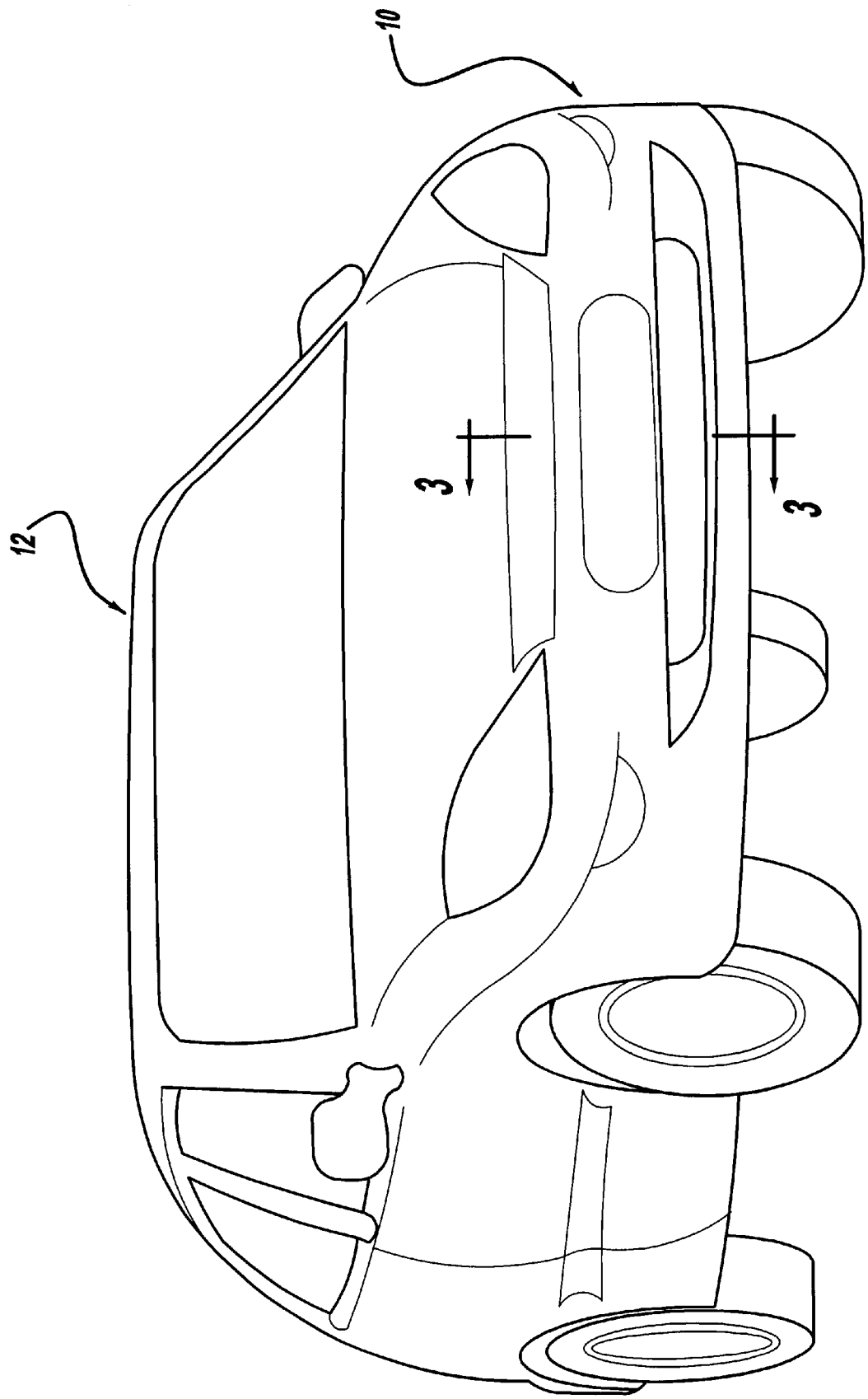
FIG. 1 is a perspective view of a bumper system, according to the present invention, illustrated in operational relationship with a motor vehicle.
Figure 2:
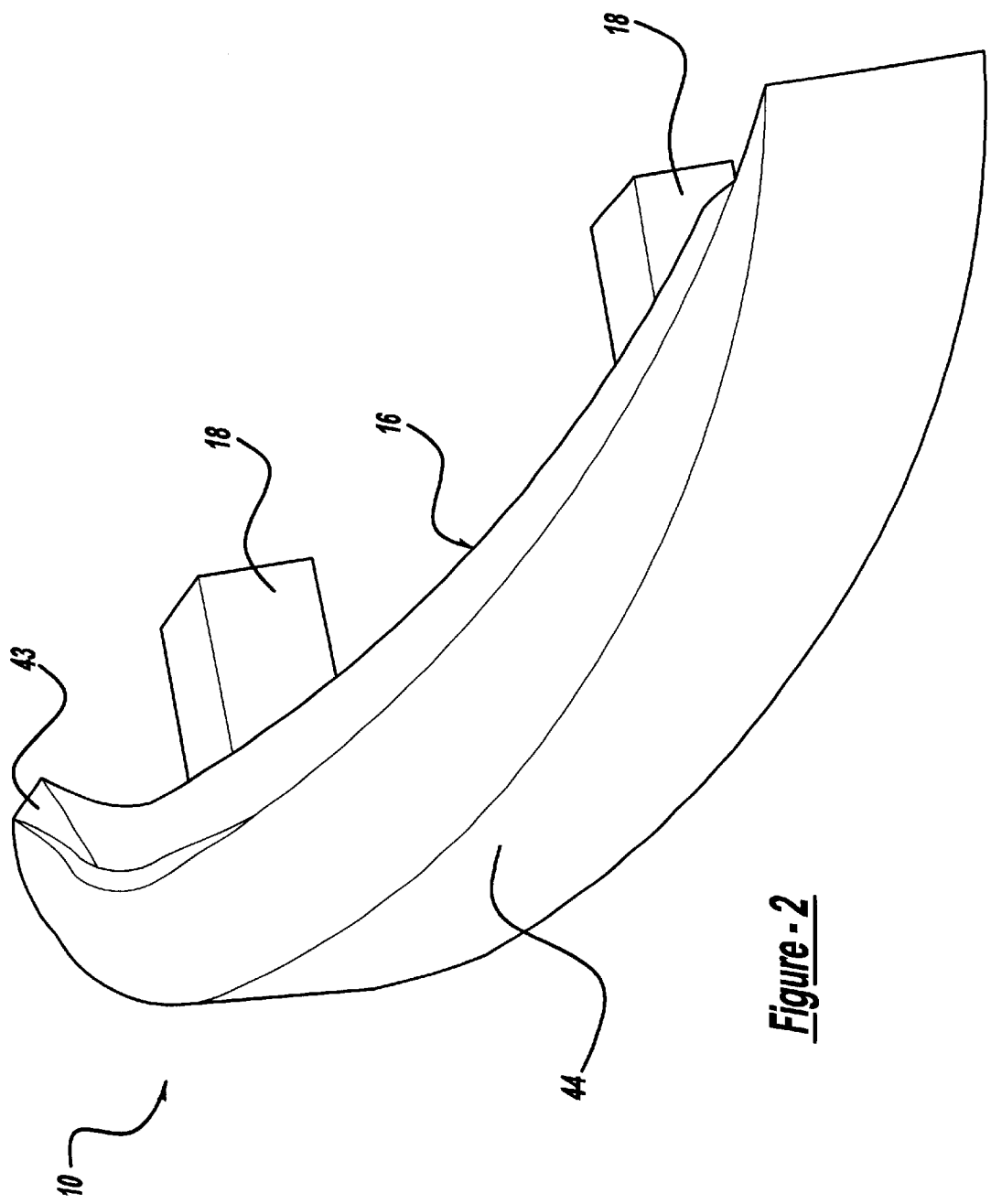
FIG. 2 is a perspective view of the bumper system of FIG. 1.

Referring to the drawings and in particular FIG. 1, one embodiment of a bumper system 10, according to the present invention, is illustrated in operational relationship with a motor vehicle 12. The bumper system 10 is disposed at a front or forward end of the motor vehicle 12. It should be appreciated that the bumper system 10 may be disposed at a rear or rearward end of the motor vehicle 12. It should also be appreciated that, except for the bumper system 10, the motor vehicle 12 is conventional and known in the art.

As illustrated in FIGS. 2 through 5, the bumper system 10 includes a bumper beam, generally indicated at 16. The bumper beam 16 extends laterally and is secured to a forward end 17 of a pair of front rails 18 by suitable means such as welding or mechanical fastening. The bumper beam 16 is a hollow member having a general "B" cross-sectional shape. The bumper beam 16 has a front or impact wall 20 extending generally vertically and laterally. The bumper beam 16 also has an upper or top wall 22 and a lower or bottom wall 24 inclined from the impact wall 20 and extending laterally. The bumper beam 16 has a curved or arcuate forward corner wall 26 interconnecting the impact wall 20 and the upper and lower walls 22 and 24. The bumper beam 16 also has a rear or supporting wall 28 extending generally vertically and laterally from the upper and lower walls 22 and 24. The bumper beam 16 has a curved or arcuate rear corner wall 30 interconnecting the supporting wall 28 and the upper and lower walls 22 and 24. It should be appreciated that the impact wall 20 has a height greater than the supporting wall 28.

The bumper beam 16 also has a plurality of, preferably two generally horizontal interior walls 32 extending laterally and longitudinally forward toward the impact wall 20. The bumper beam 16 has a curved or arcuate inner corner wall 34 interconnecting the interior walls 32 and supporting wall 28. The bumper beam 16 has an inclined transition wall 36 extending laterally and longitudinally forward from the interior walls 32 and toward a center of the impact wall 20 and a curved or arcuate projection wall 38 interconnecting the ends of the transition walls 36. The impact wall 20 is formed as two portions with each portion extending from the front corner walls 26 and spaced vertically from each other to form a gap 40 therebetween. The projection wall 38 is secured to the upper and lower portions of the impact wall 20 by suitable means such as welding or mechanical fastening to increase a stability of the bumper beam 16 against a "match boxing" behavior. The upper and lower portions of the impact wall 20 have a plurality of apertures 42 extending therethrough and spaced laterally for a function to be described.

Figure 3:
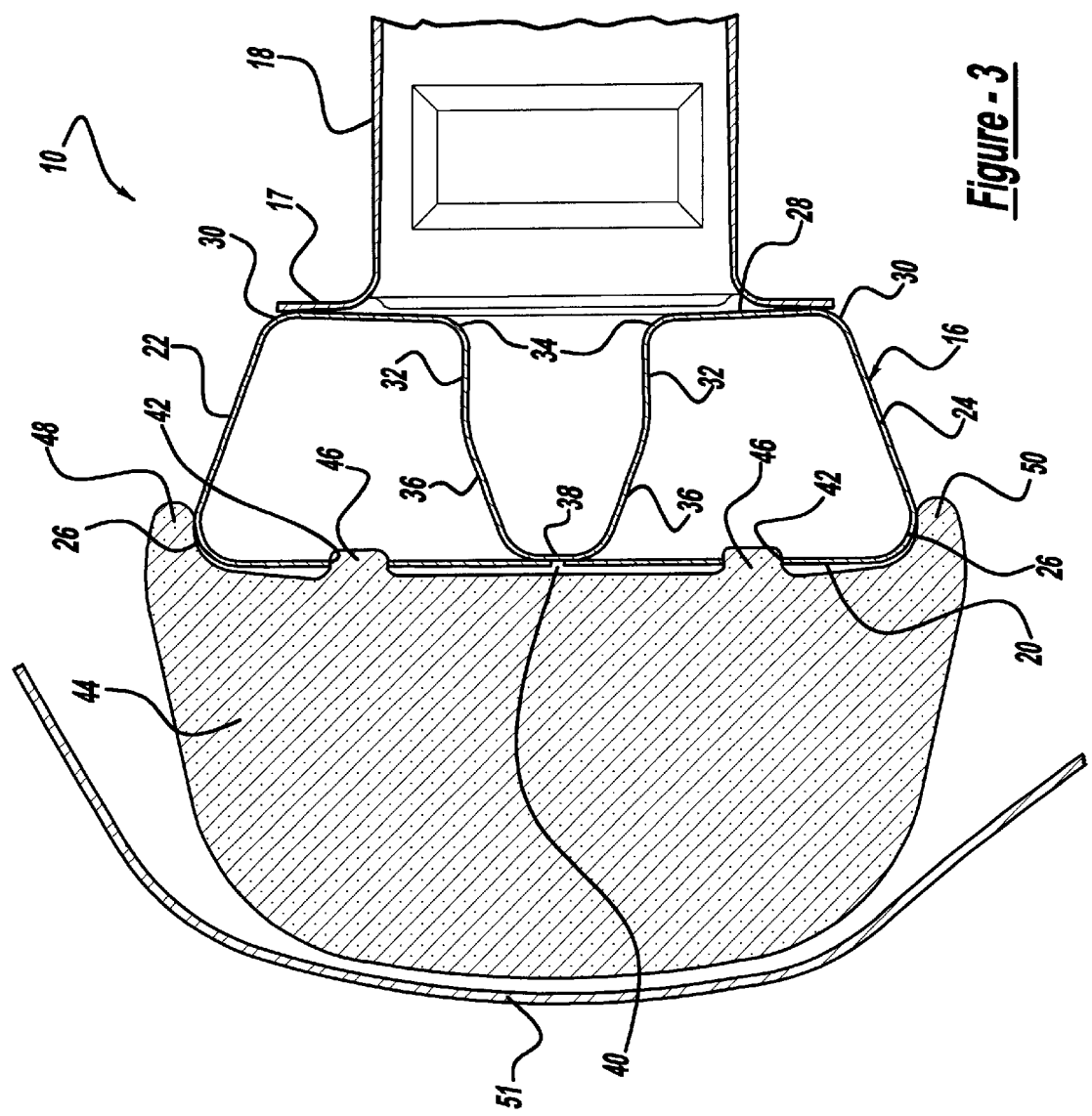
FIG. 3 is a sectional view taken along line 3—3 of FIG. 1.
Figure 4:
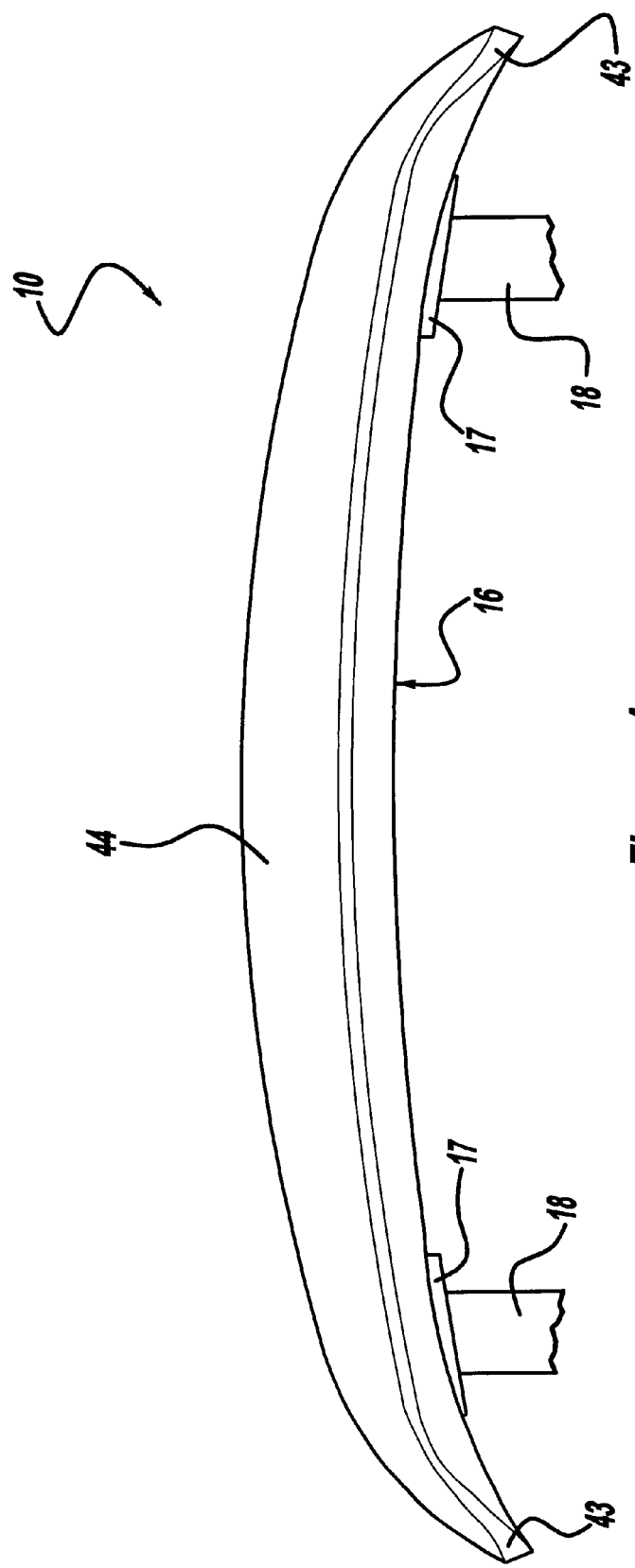
FIG. 4 is a plan view of the bumper system of FIG.

As illustrated in FIG. 3, a top wall of the rail 18 is located between the upper wall 22 and the top interior wall 32 of the bumper beam 16 and a lower wall of the rail 18 is located between the lower wall 24 and the lower interior wall 32 of the bumper beam 16 in a symmetrical manner. As a result, the stiffness of the rail 18 causes the two interior walls 32 to collapse prior to the upper and lower walls 22 and 24 collapse. It should be appreciated that this overlapping collapse assures a uniform energy absorption characteristic in high-speed impacts. It should also be appreciated that the walls 22, 24, and 32 may have a plurality of apertures (not shown) extending therethrough to achieve a desired crush stiffness of the bumper beam 16.

Figure 5:
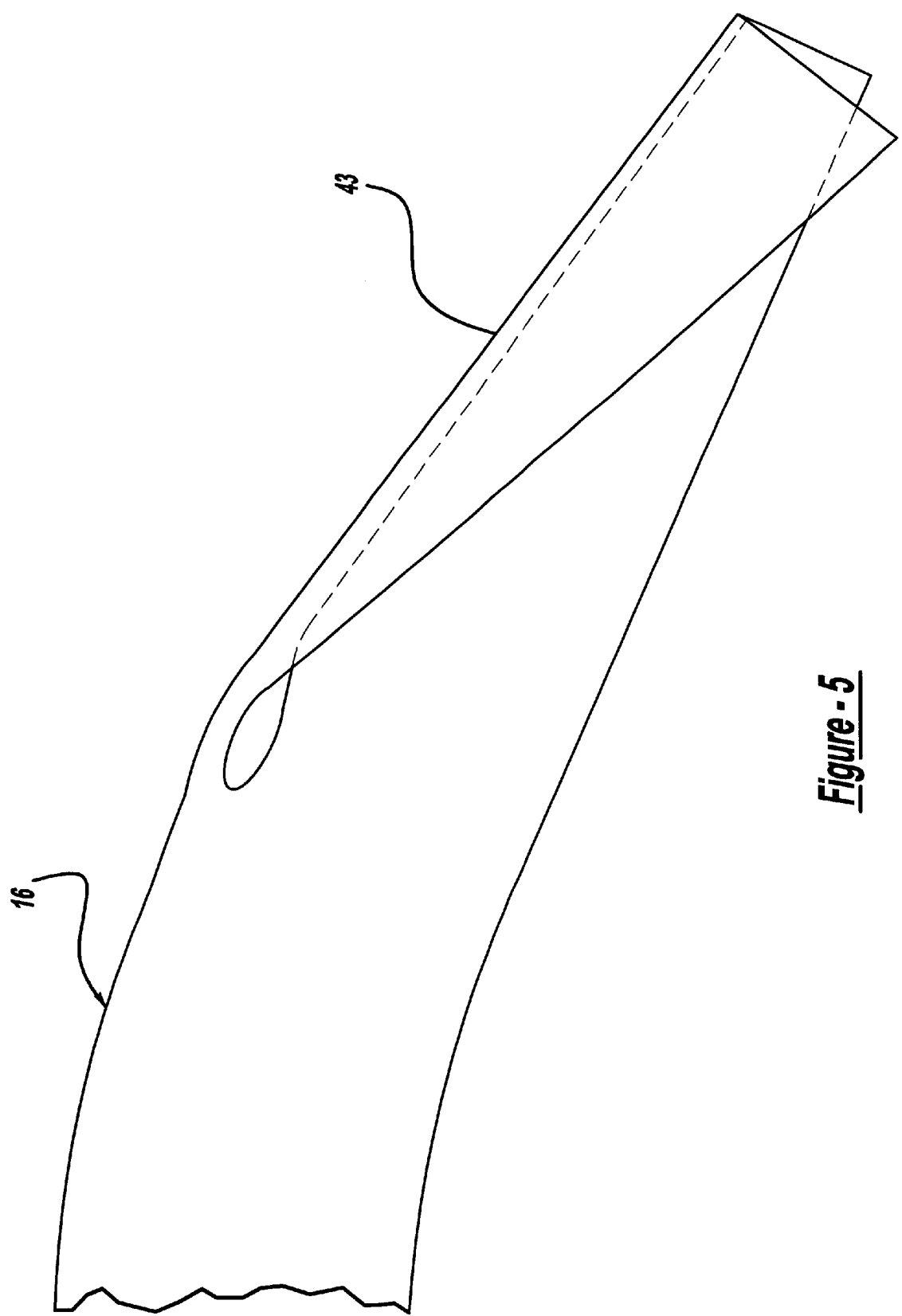
FIG. 5 is a partial perspective view of a bumper beam of the bumper system of FIG. 1.

As illustrated in FIG. 5, the bumper beam 16 has ends 43 that may go through an end forming process by mechanically collapsing the end portion of the bumper beam 16 in order to reduce bumper corner depth. It should be appreciated that the "B" shape of the end portion is collapsed to a general "V" shape.

The bumper beam 16 is made of a relatively rigid material such as metal. The bumper beam 16 is integral, unitary, and formed as one-piece by manufacturing processes such as roll forming which a conventional process known in the art. It should also be appreciated that other manufacturing processes such as extruding and stamping may be used to form the bumper beam 16. It should also be appreciated that the bumper beam 16 may be attached to a rearward end (not shown) of a pair of rear rails (not shown) of the motor vehicle 12 by suitable means such as welding.

The bumper system 10 includes an energy absorber or bumper 44. The energy absorber 44 extends laterally and is secured to the bumper beam 16. The energy absorber 44 has a plurality of projections 46 extending rearward therefrom and through the apertures 42 in the impact wall 20. The energy absorber 44 is a solid member having a generally trapezoidal shape with rear upper and lower lips 48 and 50 extending rearward. The upper and lower lips 48 and 50 have a generally arcuate or curved shape to extend over the front corner walls 26 of the bumper beam 16. The energy absorber 44 is made of a relatively deformable material such as foam. The bumper beam 16 may have a horizontal sweep to reduce the depth of the deformable material of the energy absorber 44. It should be appreciated that the apertures 42 in the impact wall 20 allows the energy absorber 44 to have local penetration in order to avoid excess compacting of the deformable material during a high-speed impact with an object (not shown).

The bumper system 10 further includes a fascia 51 extending laterally and vertically to cover the energy absorber 44. The fascia 51 is secured to vehicle structure (not shown) by suitable means such as fasteners (not shown). The fascia 51 is made of a relatively rigid material such as plastic. It should be appreciated that the fascia 51 is conventional and known in the art.

Figure 6:
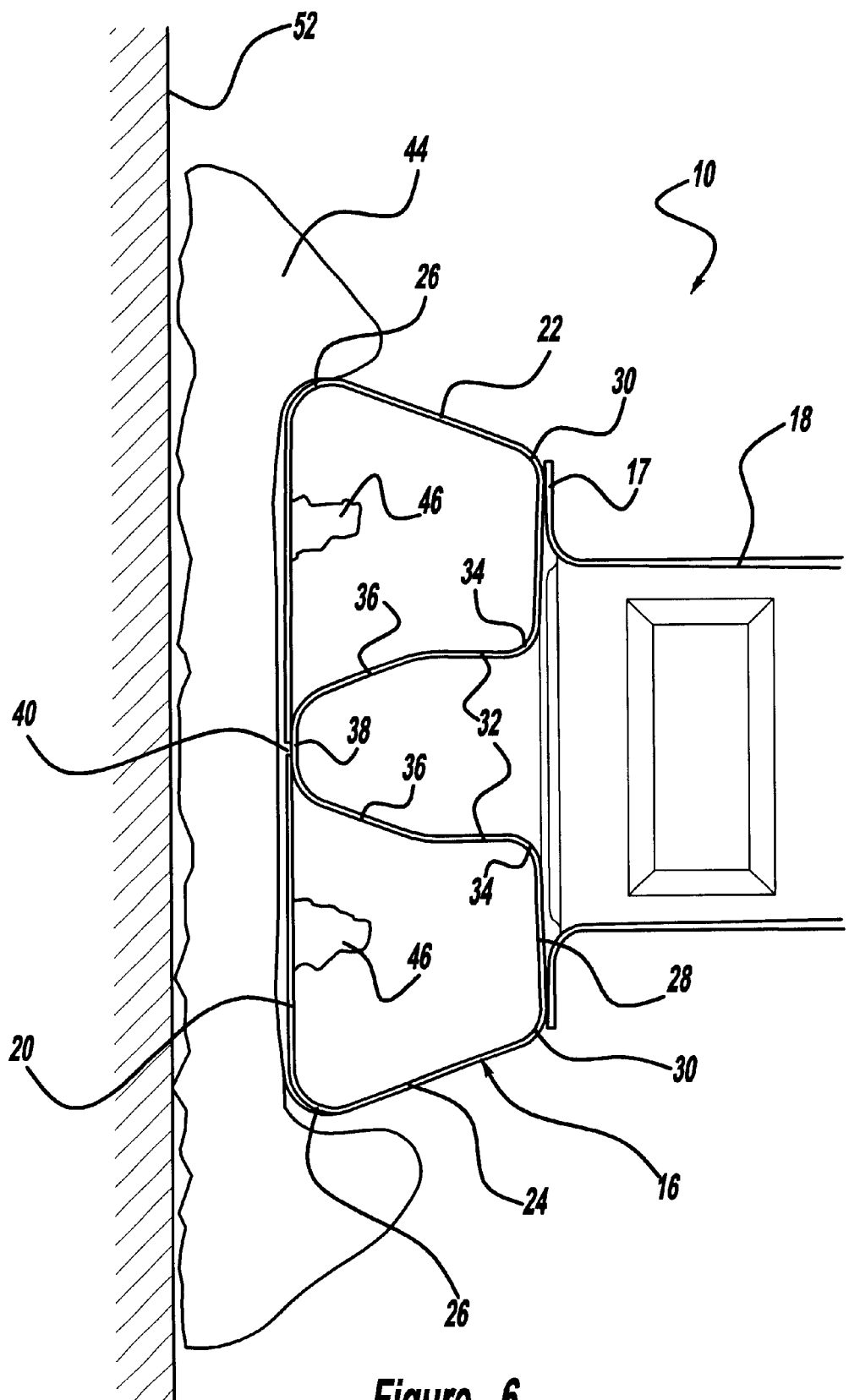
FIG. 6 is a fragmentary elevational view of the bumper system of FIG. 1 illustrating a first stage of a low-speed impact.

In operation, the bumper system 10 has a first stage or mode as illustrated in FIGS. 3 and 6. In the first mode at low speeds (i.e., less than or equal to approximately ten miles per hour), the bumper system 10 impacts an object such as a wall 52. The energy absorber 44 is deformed and absorbs the energy of the impact without deforming the bumper beam 16. In this case, the energy absorber 44 is compressed longitudinally and expands vertically to absorb the impact energy and the slower impact speed will not have a tendency to deform or collapse the bumper beam 16.

Figure 7:
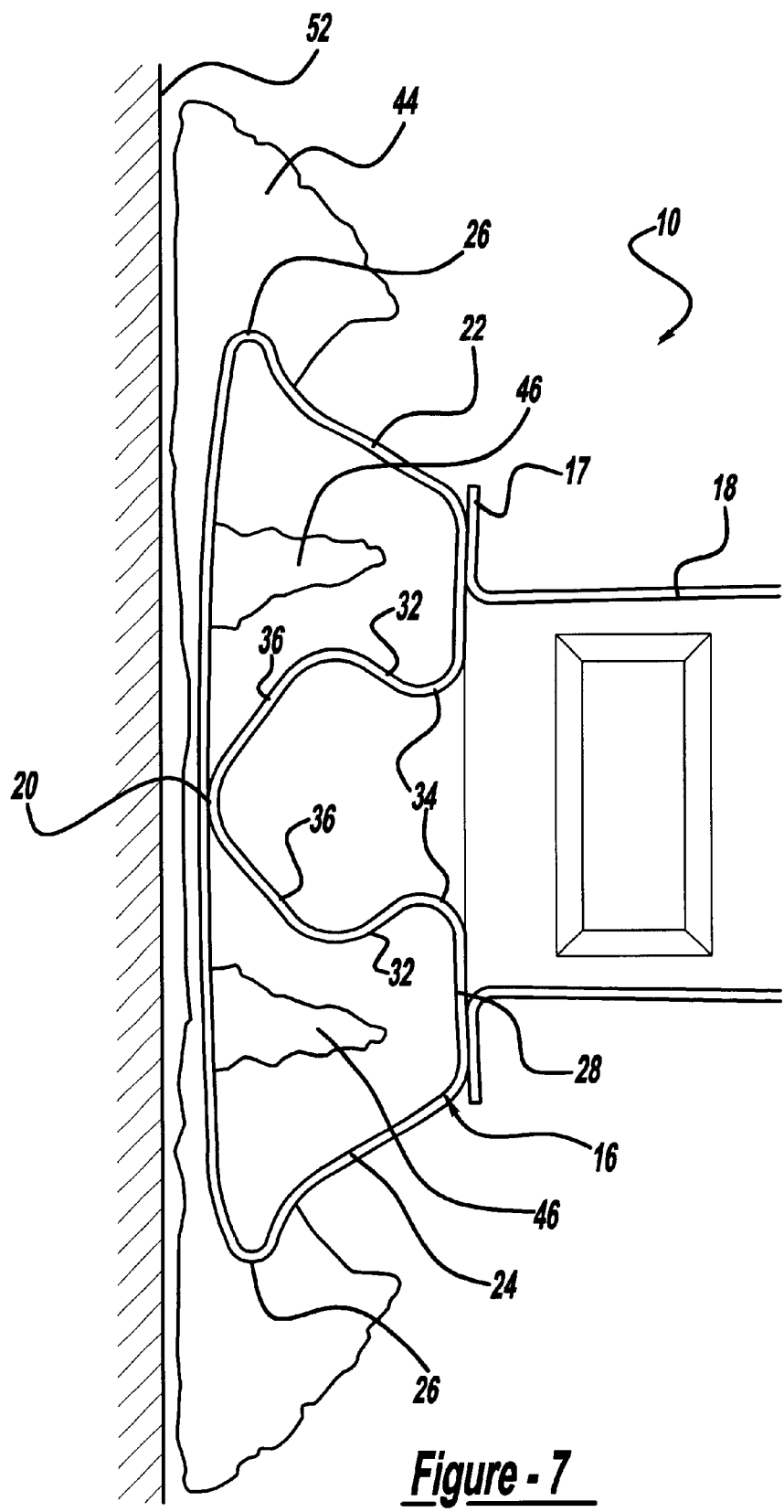
FIG. 7 is a view similar to FIG. 6 illustrating a second stage of a high-speed impact.
Figure 8:
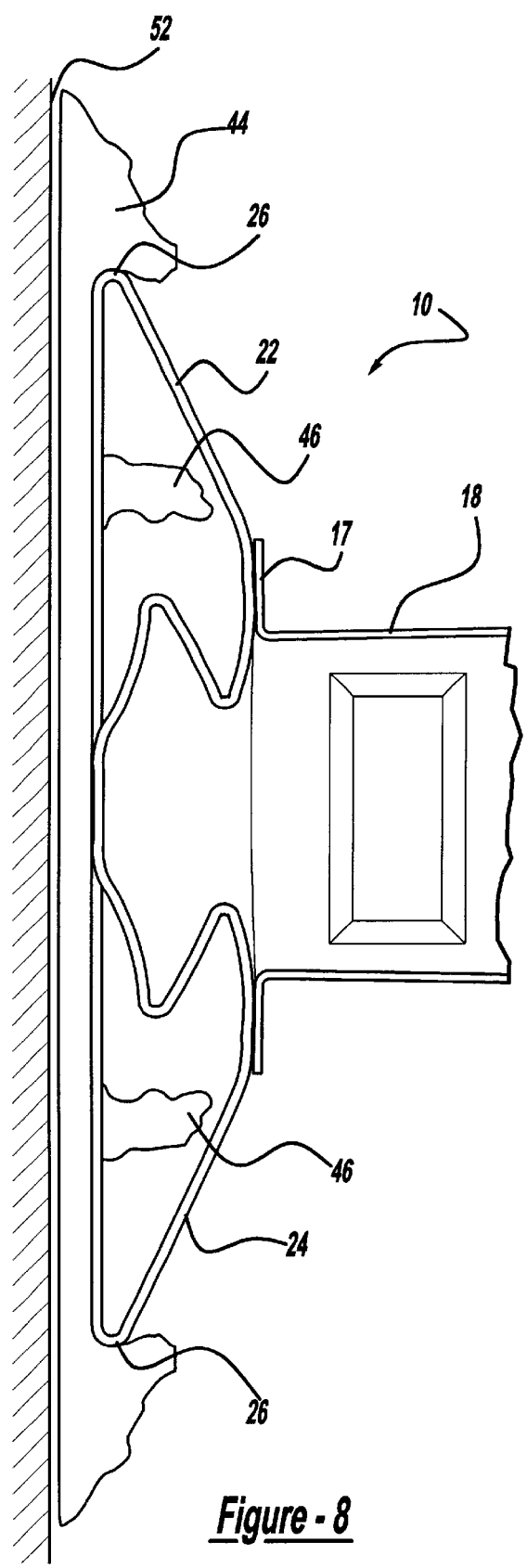
FIG. 8 is a view similar to FIG. 6 illustrating a further deformed second stage of a high-speed impact.
Figure 9:
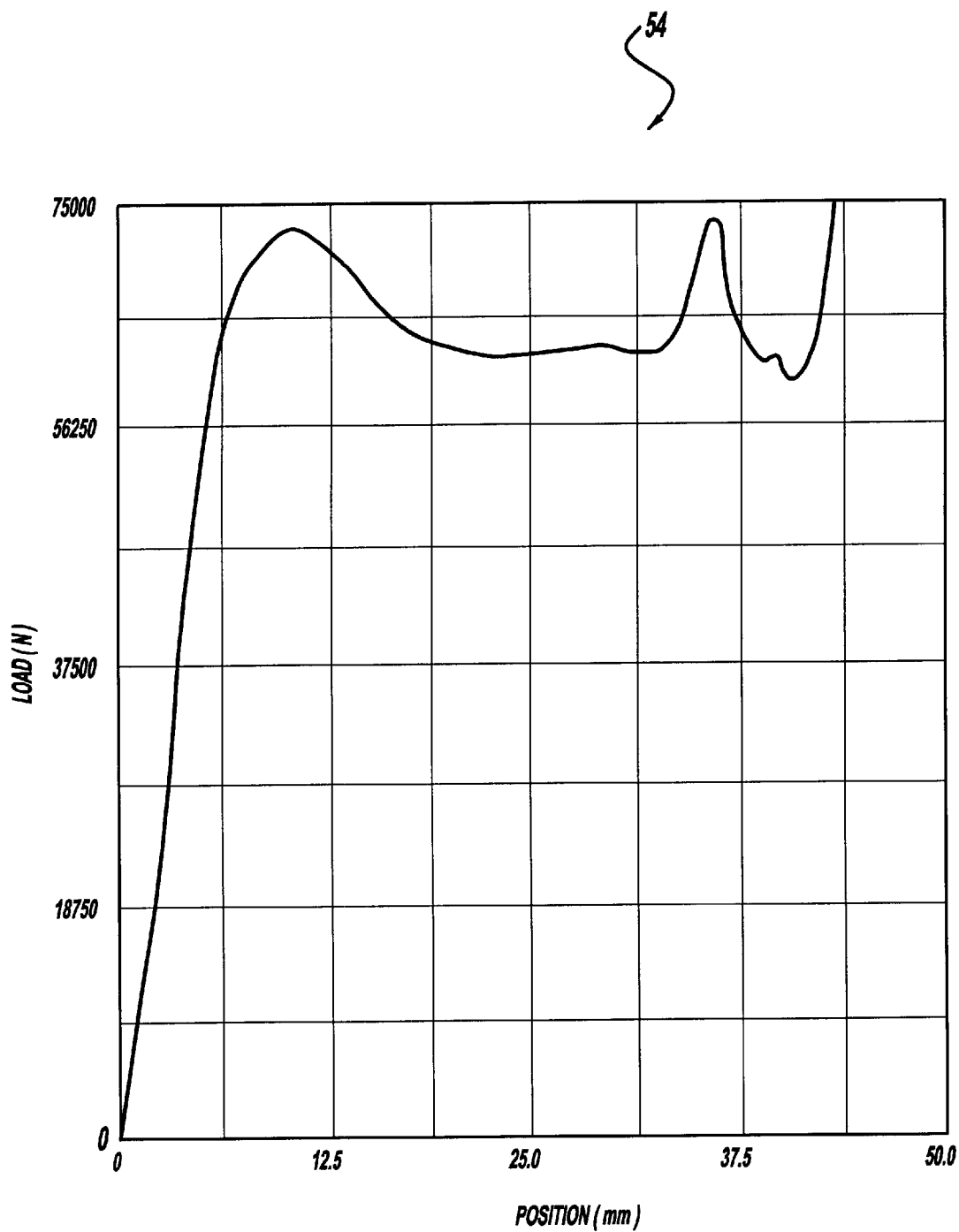
FIG. 9 is a graph of load versus position for the bumper system of FIG. 1.

Referring to FIGS. 7 and 8, the bumper system 10 has a second stage or mode as illustrated. In the second mode at high speeds (i.e., greater than approximately ten miles per hour), the bumper system 10 impacts an object such as the wall 52. The two interior walls 32 initiate first stage plastic hinge points around the corner walls 34 to deform the walls 32 partially due to its geometry and partially due to the partial supporting of the vehicle structure such as the rail 18. The deformable material of the energy absorber 44 will be locally extruded into the hollow interior of the bumper beam 16 through the apertures 42 in the impact wall 20. The upper and lower walls 22 and 24 initiate second stage plastic hinge points around the corner walls 26 to deform the upper and lower walls 22 and 24 of the bumper beam 16. The bumper beam 16 will finally go into its compact stage by total deformation of all generally horizontal walls 22, 24, and 32. A graph 54 of load in Newtons (N) versus position in millimeters (mm) is shown for a static force deflection of the bumper system 10 as illustrated in FIG. 9.

Figure 10:
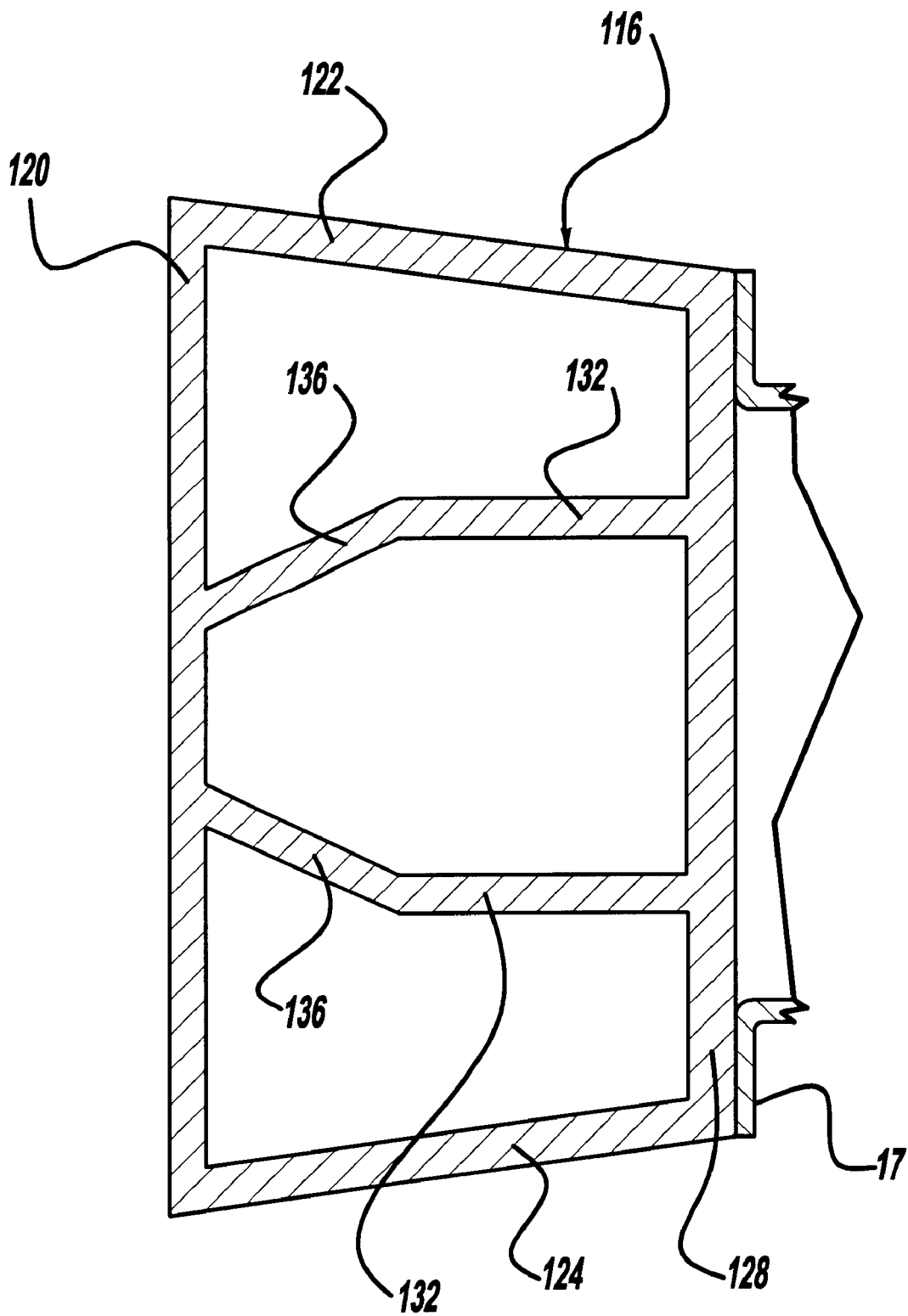
FIG. 10 is a fragmentary elevational view of another embodiment, according to the present invention, of the bumper beam of FIG. 3.
Figure 11:
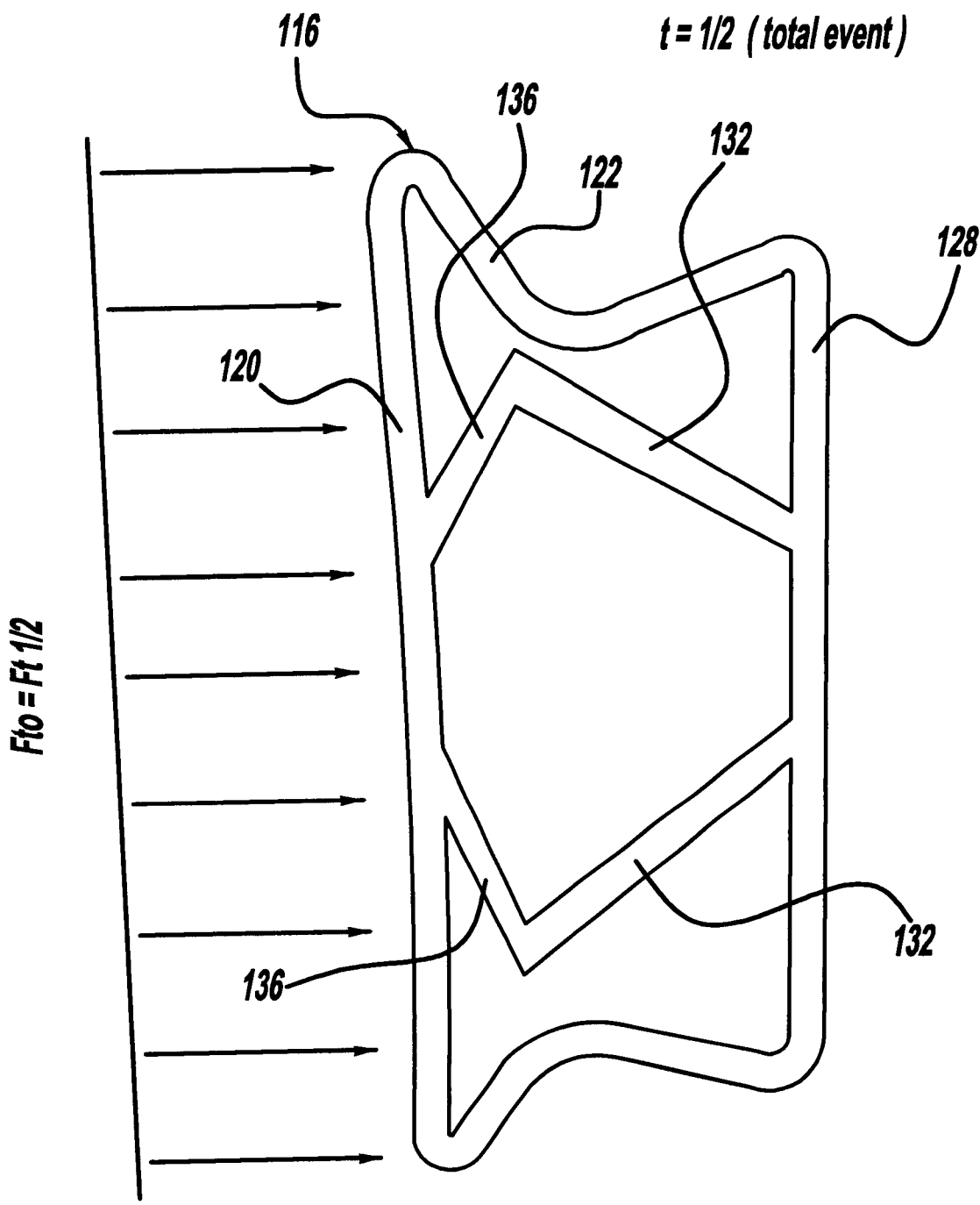
FIG. 11 is a view similar to FIG. 10 illustrating a deformed stage.

Referring to FIGS. 10 and 11, another embodiment 116, according to the present invention, of the bumper beam 16 for the bumper system 10 is shown. Like parts of the bumper beam 16 have like reference numerals increased by one hundred (100). In this embodiment illustrated in FIG. 10, the bumper beam 116 is integral, unitary, and formed as a one-piece extrusion by an extruding process, which is conventional and known in the art. The bumper beam 116 has a solid impact wall 120, tapered upper and lower walls 122 and 124, respectively, and a supporting wall 128 to form a box-like cross-section. The bumper beam 116 also has the interior walls 132 extending from the supporting wall 128 and the inclined transition walls 136 extending from the interior walls 132 to the impact wall 120 to form a triple chamber closed section. The operation of the bumper beam 116 is similar to the bumper beam 16. It should be appreciated that the interior walls 132 contain bends opposing one another at the juncture with the inclined transition walls 136 as to form crush initiators to contribute towards uniform crushing of the cross-section under constant load as illustrated in FIG. 11.

Accordingly, the bumper system 10 has a general "B" shaped bumper beam 16,116 to improve bumper high-speed impact energy absorption efficiency. The bumper system 10 has a bumper beam 16,116 that is roll formed or extruded. The bumper system 10 balances both low-speed protection of the vehicle body and high-speed impact energy absorption.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A bumper system comprising:

an energy absorber;

a bumper beam interconnecting said energy absorber and at least one rail of a motor vehicle and having a general B shape to absorb energy during an impact with an object by said bumper system;

said bumper beam having has an impact wall extending vertically and laterally, an upper wall and a lower wall spaced vertically and extending longitudinally from said impact wall, a supporting wall spaced longitudinally from said impact wall and connected to said upper wall and said lower wall, and a plurality of interior walls spaced vertically and extending laterally and longitudinally from said supporting wall toward said impact wall; and wherein said upper wall and said lower wall are angled toward each other.

2. A bumper system as set forth in claim 1 wherein said bumper beam is either one of roll formed and extruded into said B shape.

3. A bumper system comprising:

an energy absorber;

a bumper beam interconnecting said energy absorber and at least one rail of a motor vehicle and having a general B shape to absorb energy during an impact with an object by said bumper system;

said bumper beam having an impact wall extending vertically and laterally, an upper wall and a lower wall spaced vertically and extending longitudinally from said impact wall, a supporting wall spaced longitudinally from said impact wall and connected to said upper wall and said lower wall, and a plurality of interior walls spaced vertically and extending laterally and longitudinally from said supporting wall toward said impact wall such that a top wall of the at least one rail is located between said upper wall and a top one of said interior walls and a bottom wall of the at least one rail is located between said lower wall and a lower one of said interior walls; and wherein said upper wall and said lower wall are angled toward each other.

4. A bumper system for a motor vehicle comprising:

an energy absorber;

a bumper beam interconnecting said energy absorber and vehicle structure and having a general B shape to absorb energy during an impact with an object by said bumper system;

said bumper beam having an impact wall extending vertically and laterally, a supporting wall spaced longitudinally from said impact wall and connected to said upper wall and said lower wall, and a plurality of interior walls spaced vertically and extending laterally and longitudinally from said supporting wall toward said impact wall; and wherein said bumper beam has a transition wall extending from said interior walls toward a center of said impact wall.

5. A bumper system as set forth in claim 4 wherein said bumper beam has a projection wall being arcuate in shape and interconnecting said transition wall.

6. A bumper system as set forth in claim 5 wherein said projection wall is secured to said impact wall by either one of welds or mechanical fasteners.

7. A bumper system comprising:

an energy absorber;

a bumper beam interconnecting said energy absorber and at least one rail of a motor vehicle and having a general B shape to absorb energy during an impact with an object by said bumper system;

said bumper beam having an impact wall extending vertically and laterally, an upper wall and a lower wall spaced vertically and extending longitudinally from said impact wall, a supporting wall spaced longitudinally from said impact wall and connected to said upper wall and said lower wall, and a plurality of interior walls spaced vertically and extending laterally and longitudinally from said supporting wall toward said impact wall such that a top wall of the at least one rail is located between said upper wall and a top one of said interior walls and a bottom wall of the at least one rail is located between said lower wall and a lower one of said interior walls; and wherein said impact wall has a plurality of apertures extending therethrough and said energy absorber has a plurality of projections, said projections extending through said apertures.

8. A bumper system as set forth in claim 1 wherein said bumper beam is made of a metal material.

9. A bumper system as set forth in claim 1 wherein said bumper beam is integral, unitary, and formed as one-piece.

10. A bumper system as set forth in claim 1 wherein said energy absorber is made of a deformable material.

11. A bumper system comprising:

an energy absorber; and a bumper beam interconnecting said energy absorber and at least one rail of a motor vehicle and having an impact wall extending vertically and laterally and a declined upper wall and an inclined lower wall spaced vertically and extending longitudinally from said impact wall, a supporting wall spaced longitudinally from said impact wall and connected to said upper wall and said lower wall, and a plurality of interior walls spaced vertically and extending laterally and longitudinally from said supporting wall toward said impact wall to form a general B shape to absorb energy during an impact with an object by said bumper system such that a top wall of the at least one rail is located between said upper wall and a top one of said interior walls and a bottom wall of the at least one rail is located between said lower wall and a lower one of said interior walls.

12. A bumper system for a motor vehicle comprising:

an energy absorber; and a bumper beam interconnecting said energy absorber and vehicle structure and having an impact wall extending vertically and laterally and a declined upper wall and an inclined lower wall spaced vertically and extending longitudinally from said impact wall to form a general B shape to absorb energy during an impact with an object by said bumper system;

said bumper beam having a supporting wall spaced longitudinally from said impact wall and connected to said upper wall and said lower wall and a plurality of interior walls spaced vertically and extending laterally and longitudinally from said supporting wall toward said impact wall;

wherein said bumper beam has a transition wall extending from said interior walls toward a center of said impact wall and a projection wall being arcuate in shape and interconnecting said transition wall.

13. A bumper system as set forth in claim 11 wherein said impact wall has a plurality of apertures extending therethrough and said energy absorber has a plurality of projections, said projections extending through said apertures.

14. A bumper system for a motor vehicle comprising:
- an energy absorber;
- a bumper beam interconnecting said energy absorber and vehicle structure and comprising an impact wall extending vertically and laterally, a declined upper wall and an inclined lower wall spaced vertically and extending longitudinally from said impact wall, a supporting wall spaced longitudinally from said impact wall and connected to said upper wall and said lower wall, a plurality of interior walls spaced vertically and extending laterally and longitudinally from said supporting wall toward said impact wall and a transition wall extending from said interior walls toward a center of said impact wall to form a general B shape; and
- said impact wall having a plurality of apertures extending therethrough and said bumper having a plurality of projections, said projections extending through said apertures.

* * * * *